United States Patent [19]
Youngs et al.

[11] Patent Number: 5,494,374
[45] Date of Patent: Feb. 27, 1996

[54] SECONDARY CONTAINMENT FLEXIBLE UNDERGROUND PIPING SYSTEM

[76] Inventors: Andrew Youngs, 50954 Pine Ridge Dr., Granger, Ind. 46530; Timothy A. Ashcraft, 502 Oakdale Dr., Dover, Ohio 44622

[21] Appl. No.: 146,592

[22] Filed: Nov. 1, 1993

Related U.S. Application Data

[63] Continuation-in-part of Ser. No. 859,034, Mar. 27, 1992.

[51] Int. Cl.⁶ .......................... F16L 57/00; F16L 11/12; F16L 11/20
[52] U.S. Cl. .......................... 405/52; 73/40.5 R; 405/128; 405/154; 405/157
[58] Field of Search .......................... 405/52, 128, 154, 405/157; 138/114, 123, 124, 128, 137, 138; 73/40.5 R; 588/259

[56] References Cited

U.S. PATENT DOCUMENTS

| | | |
|---|---|---|
| D. 309,308 | 7/1990 | Webb . |
| D. 313,418 | 1/1991 | Webb . |
| 3,581,776 | 1/1971 | Sheahan . |
| 3,672,103 | 6/1972 | Kost . |
| 3,720,235 | 3/1973 | Schrock . |
| 4,130,139 | 12/1978 | Haren .................................. 138/137 X |
| 4,132,083 | 1/1979 | McGrath . |
| 4,182,581 | 1/1980 | Uehara et al. . |
| 4,565,351 | 1/1986 | Conti et al. . |
| 4,639,164 | 1/1987 | Pugnale et al. . |
| 4,682,911 | 7/1987 | Moreland . |
| 4,758,455 | 7/1988 | Campbell et al. .................. 138/128 X |
| 4,778,310 | 10/1988 | Moreland . |
| 4,805,444 | 2/1989 | Webb . |
| 4,932,257 | 6/1990 | Webb . |
| 4,968,179 | 11/1990 | Frahm . |
| 4,971,477 | 11/1990 | Webb et al. . |
| 5,040,408 | 8/1991 | Webb . |
| 5,052,444 | 10/1991 | Messerly et al. .................. 138/128 X |
| 5,060,509 | 10/1991 | Webb . |
| 5,093,166 | 3/1992 | Nishimura .......................... 138/137 X |
| 5,135,324 | 8/1992 | Bravo . |
| 5,297,896 | 3/1994 | Webb .................................. 405/52 |

Primary Examiner—Stephen J. Novosad
Attorney, Agent, or Firm—Basile and Hanlon

[57] ABSTRACT

The secondarily contained piping system having two spaced access chambers that are interconnected by a secondary containment pipe to provide a sealed arrangement for a flexible fluid supply pipe, the ends of which are disposed within the access chambers. The outer flexible pipe is sized to permit the insertion and/or removal of the primary flexible pipe during installation and testing of the same and after backfilling of the trench within which the pipe is disposed, the outer flexible tubing partially collapses to engage and prevent relative movement between the two pipes while providing a flow path thereinbetween.

21 Claims, 5 Drawing Sheets

SECONDARY CONTAINMENT FLEXIBLE UNDERGROUND PIPING SYSTEM

CROSS-REFERENCE TO RELATED APPLICATIONS

This application is a continuation-in-part of pending U.S. patent application Ser. No. 07/859,034, filed Mar. 27, 1992.

BACKGROUND OF THE INVENTION

The present invention relates to secondary containment systems and especially, although not exclusively to a piping construction and a method for providing secondary containment systems for hydrocarbon storage and delivery systems.

A secondary containment system is one which functions to collect and contain the fluids leaking out of another and primary containment system. For example, a primary containment system may store and deliver gasoline at a filling station. A secondary containment system would collect and contain the same gasoline if a primary delivery pipe should rupture or otherwise spill the gasoline. Secondary containment systems have been developed to overcome the environmental problems that have been encountered with respect to leakage of hazardous fluids from tanks and pipe lines. As indicated, this has been a particular problem with respect to underground installations in which undetected leakage of hazardous fluids into the surrounding terrain over long periods of time has produced harmful conditions and extensive pollution which are difficult and expensive to clean.

Today there is great public concern because chemicals are penetrating into underground water supplies contaminating public drinking water and making some of the food supply unusable, among other things. The entire environment is being degraded to a serious level which tends to cast doubt on the future availability of safe water. Therefore, many government agencies have enacted and continue to enact laws which require a secondary containment system designed to capture and contain the spilled gasoline or other liquid materials thus preventing it from leaking into the surrounding earth. The capture gasoline or other liquid material may then be pumped out of the secondary container for proper disposal. This eliminates the possibility of gasoline spillage to contaminate underground water supply.

Manufacturers of containment systems have responded by developing and producing a variety of secondary containment systems for conventional underground piping which are designed to contain and prevent any leakage from escaping into the environment. Many of these systems have proven to be effective containment systems but have been found to be difficult and costly to install.

One known approach to secondary containment systems, and, in particular, the secondary containment of underground conventional piping has been to line the piping trench with an impervious flexible membrane liner or semi-rigid trough. This technique can provide a measure of secondary containment of leaky product but such an approach does not allow for effective leaking detection in that it does not permit the determination of which pipe is leaking and the location of the leak in the piping line when the same occurs. It is also difficult to test such systems using air pressure testing devices. Additionally, these secondary containment systems do not provide 360° containment, and therefore can fill with water and become ineffective.

Another approach toward solving the problem of underground leakage in such conventional piping systems has been to install a large semi-conventional piping system over the conventional underground piping as a means for providing the secondary containment. With such an arrangement, the outer secondary containment rigid pipe is installed simultaneously with the product piping. The outer secondary containment pipe by necessity has a larger diameter than the supply pipe to enable secondary containment pipe to slide over the smaller pipe. The secondary containment pipe fittings are of a clam shell design adapted to fit over the supply pipe fitting and connect to the secondary containment pipe. The clam shell fitting is sealed to itself and the secondary container pipe by a variety of sealing techniques. Depending on the type of secondary containment system used, these sealing techniques could include metal or plastic fasteners used with a combination of adhesives, sealants and the like. Such secondary systems are generally expensive to install because of the cost of the components which are used and the time required to assemble both the product and the secondary containment piping systems.

Another known approach to solving the aforementioned problems is to employ a semi-conventional piping system over the conventional product piping. This type of containment system differs from the first described system in that it is not an entirely rigid straight pipe but rather a combination of rigid straight pipe with a larger diameter, convoluted plastic pipe over it which produces a telescoping effect. The convoluted section of telescopic containment pipe serves as a fitting of containment of the product, 90° and 45° fittings as well as unions, flexible connectors, swing joints, should they be so attached. The convoluted pipe is designed to be flexible and sized to be shifted around any angles in the production piping system.

Another type of secondary containment piping system has been developed which utilizes spaced access chambers interconnected by a secondary containment pipe to provide a sealed housing for a flexible fluid supply pipe, the ends of which are disposed within the access chambers and have a connector element at each end forming a section adapted to be interconnected to other fluid conduits. The diameter and bending radius of the fluid supply pipe and the size of the access chamber are such as to permit the fluid pipe, after uncoupling, to readily be removed from the secondary containment pipe through one of the access chambers. Should a leak occur in the piping, the secondary containment system allows the piping to be removed and replaced.

It is very difficult and expensive to meet all of the many different environmental and safety standards at a reasonably acceptable cost, particularly in light of the many state and local governments writing individual laws that impose a wide variety of standards which the manufacturers of such systems must meet.

Accordingly, an object of the invention is to provide a new and improved secondary containment system which will draw all spilled fluids that may leak from a primary supply pipe to a preselected collecting point which may be monitored.

Another object of the present invention is to provide a practical secondary containment system which may be manufactured in a factory, shipped and installed at a reasonably low cost in a fully usable manner and yet one which meets all requirements of the environment within which they must be used.

It is a further object of the present invention to provide an economical, easily installed, highly durable and environmentally secure flexible piping system. It is a further object of the present invention to provide such a flexible piping system which may optionally eliminate coextrusion.

SUMMARY OF THE INVENTION

The present invention addresses and solves the problems enumerated above. The present invention comprises a secondary containment piping system, comprising an inner supply pipe. The piping system further comprises a flexible, fuel impervious outer secondary containment pipe, within which the inner supply pipe is carried. One of an outer surface of the inner supply pipe and an inner surface of the outer pipe has a plurality of radially outwardly projecting flanges adapted to engage the other of the outer surface of the inner supply pipe and the inner surface of the outer pipe when the pipes are buried. This provides a locking engagement of the pipes with respect to each other, and provides for a flow passage between the pipes. The inner pipe is comprised of a first, inner layer being fabricated from nylon; a second layer comprising a wrap having two opposed longitudinal edges in overlying relationship, the wrap being fabricated from a polyester film; a third layer comprising a nylon reinforced braid; and a fourth, outer layer comprising a polyethylene material. The outer pipe is comprised of a first, inner layer comprised of one of a polyethylene or an ethylene vinyl acetate material, the first layer having a plurality of radially inwardly projecting flanges; a second layer comprising a wrap having two opposed longitudinal edges, the wrap being fabricated from a metallized polyester film; and a third, outer layer comprising a polyethylene material.

BRIEF DESCRIPTION OF THE DRAWINGS

Other objects, advantages and applications of the present invention will become apparent to those skilled in the art of underground piping systems when one example of the best mode of the present invention is read in conjunction with the accompanying drawings, in which.

DESCRIPTION OF THE PREFERRED EMBODIMENTS

Figure 1:
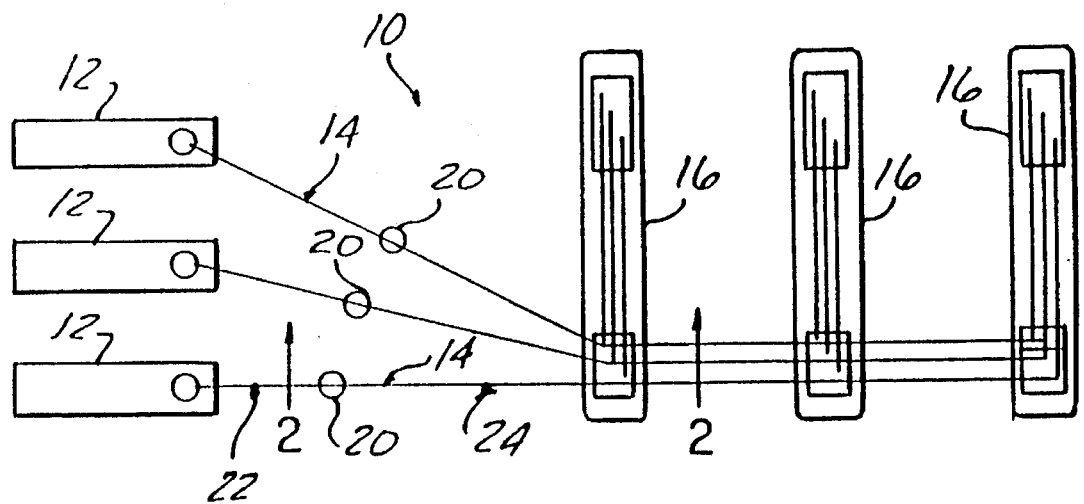
FIG. 1 is a schematic layout of an exemplary gasoline storage and delivery system.
Figure 2:
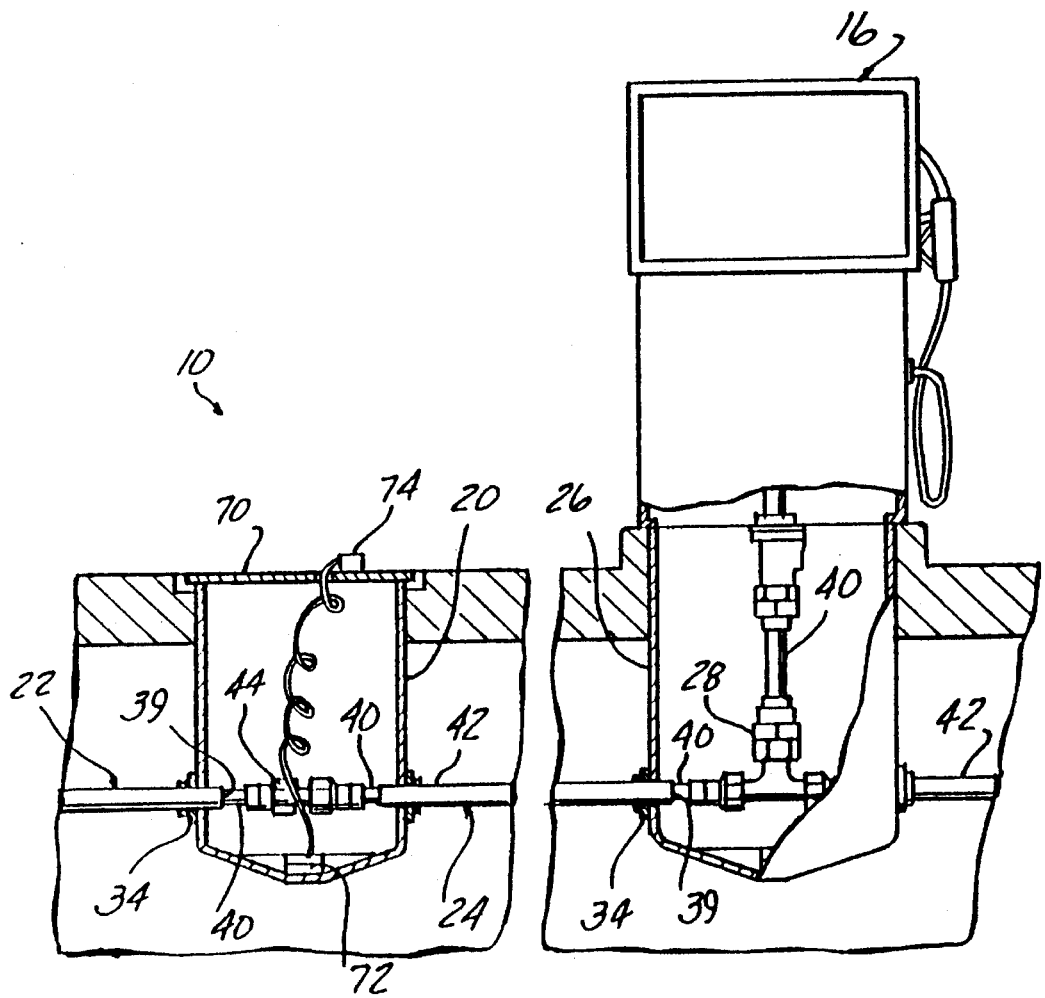
FIG. 2 is an enlarged side view of a portion of the fuel dispensing system of FIG. 1 as seen generally along line 2—2 thereof.

Referring now to the drawings, and, in particular, to FIGS. 1 and 2, wherein there is illustrated an underground fuel storage and dispensing system generally indicated at 10 comprising fuel tanks 12 from which a plurality of underground fuel supply pipes 14 extend for distribution of fuel to dispersion areas 16 in a conventional manner. The system includes one or more access chambers 20 which are also disposed below the surface dispensing station 16. The access chambers 20 and the fuel tanks 12 are interconnected by containment pipe segments 22 while the access chambers are connected via pipe segments 24 to a conventional drip pan 26 beneath the dispenser 16 and is connected thereto through suitable elbow connectors 28. The access chamber 20 and the pan 26 are interconnected in a fluid sealing manner through their side walls just above the bases thereof by means of the secondary containment pipe 24.

Figure 3:
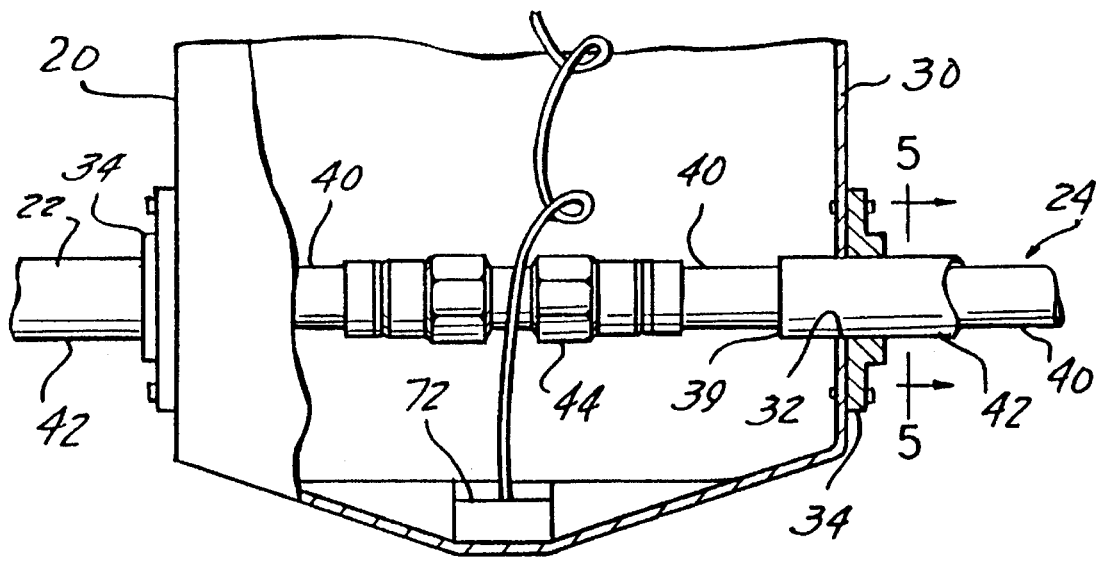
FIG. 3 is an enlarged view of a portion of the system illustrated in FIG. 2.

As can best be seen in FIG. 3, the side wall 30 of the access chamber 20 has an opening 32 through which the end of the pipe 24 extends. A conventional seal 34 surrounds the outer surface of the containment pipe 24 and provides a fluid tight seal for the interior of the access chamber 20.

As will be described in greater detail hereinafter, the secondary containment piping system comprises a flexible inner supply pipe 40 which is completely encased within a flexible outer containment pipe 42. It should be noted by reference to FIG. 3, that the outer containment pipe 42 extends into the access chamber 20 a sufficient distance so that it clears the interior of the wall 30 of the access chamber 20. During fabrication this will permit the insertion on the terminated end 39 of pipe 42 of a suitable air pressure device to permit testing as will be explained hereinafter. The inner pipe 40 extends past the terminated end 39 of the outer pipe 42 a sufficient distance to permit it to be coupled by suitable conventional couplings 44 to another inner pipe 40 which, in turn extends outwardly from the access chamber 20 through an outer containment pipe 42. At the drip pan 26, the pipe 40 exits therethrough and continues through a containment pipe 42 on to the next island.

The access chamber 20 has a removable cover 70 to permit easy access thereto for removal of any fuel that might be captured by the containment pipe 40. A fluid sensor 72 is disposed in the bottom of the access chamber 22 and is electrically connected to an appropriate indicator or alarm 74. When there is an accumulation of fluid, such as due to leakage from the primary pipe 40, the fluid will actuate the alarm.

Figure 4:
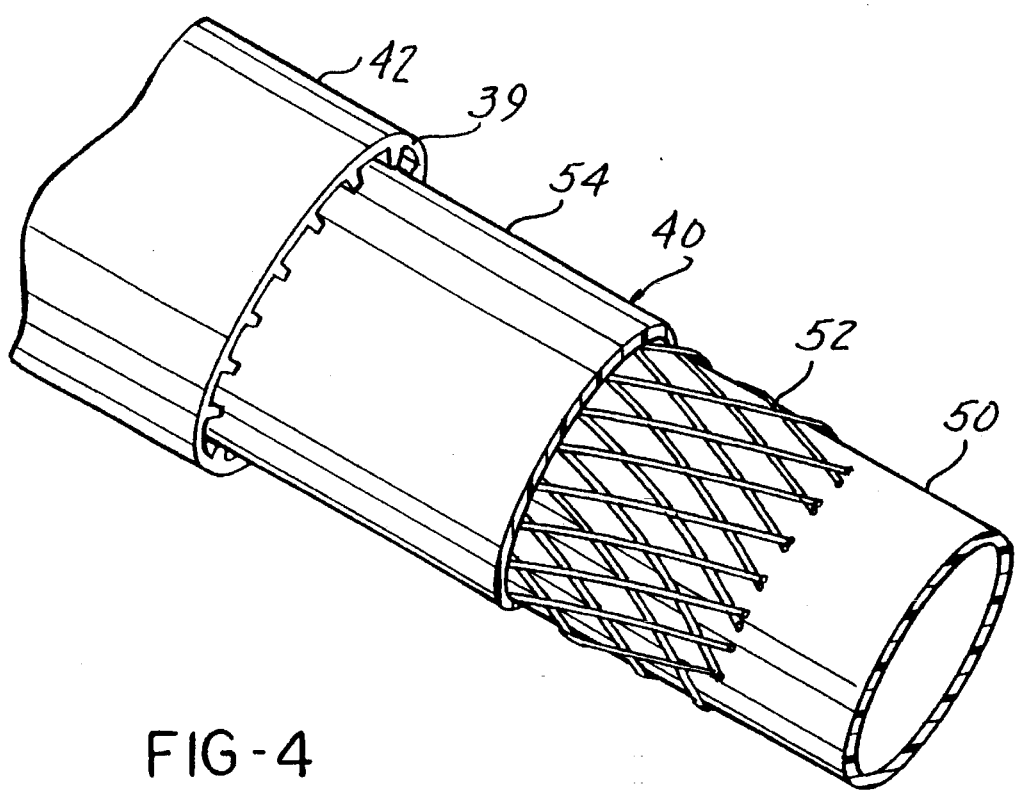
FIG. 4 is an enlarged perspective view of the inner and outer pipes utilized in the secondary containment piping system of the present invention with layers of the inner pipe removed for illustrative purposes.
Figure 5:
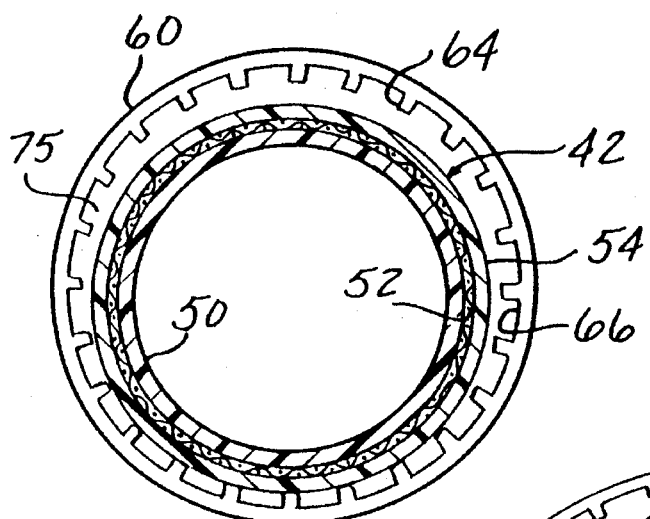
FIG. 5 is a cross sectional view taken generally along line 5—5 prior to the backfilling of the trench within which the pipes are located.

As can best be seen in FIGS. 4 and 5, the inner pipe 40 is made from a fuel impervious material and is comprised of three layers of material which are extruded together and comprise an interior layer 50, which is fabricated from a nylon 12 material; an intermediate layer 52 consisting of a nylon 6 yarn reinforcement wrap; and an exterior outer material 54 which is preferably fabricated from a polyethylene material. The inner layer 50 is 0.080" thick and the outer layer is preferably 0.060" thick. In the preferred embodiment, the pipe 40 has an inside diameter of 1.68" and an outside diameter of 1.960", a maximum operating pressure of 150 psi and a minimum burst pressure of 750 psi. The material is flexible and has a bend radius of 12" to 24".

Figure 4A:
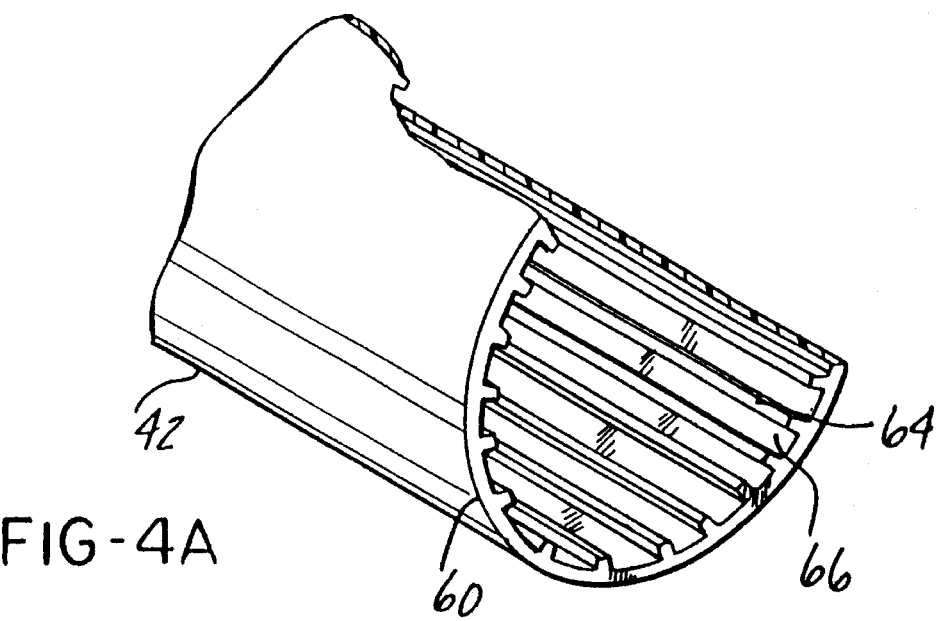
FIG. 4A is a fragmentary perspective view of the outer secondary containment pipe illustrated in FIG. 4.

The inner pipe 40 is completely encased in the outer containment pipe 42 which, as can best be seen in FIGS. 4, 4A and 5, comprises an integrally extruded member having a wall 60, the interior of which is provided with a plurality of angularly spaced, radially inwardly extending ribs or projections 64 that define thereinbetween U-shaped cross sections 60. Outer pipe 42 may be extruded separately from inner pipe 40, or may be coextruded therewith. The projections extend along the full length of the interior of the wall 60 (FIG. 4A). The outer pipe 42 is sized to permit the inner pipe 40 to be inserted therein with little or no resistance and is, preferably, assembled in the combined arrangement at the factory, ready for positioning in the pipe trenches when delivered onsite. The outer pipe 42 is very flexible and can bend as needed to accommodate the bending of the primary inner pipe 40. The outer pipe 42 is made from a fuel impervious material such as a nylon or polyethylene, clear acrylonitrile or clear polyurethane material.

In another preferred embodiment, in order to achieve greater permeation resistance, outer pipe 42 may optionally be formed from a plasticized nylon 11, or a polyester elastomer used as a thermoplastic rubber. One such polyester elastomer is commercially available from E. I. du Pont de Nemours Co. under the tradename HYTREL. Outer pipe 42 may further be optionally formed from a coextrusion of low density polyethylene or SURLYN ionomer as an inner layer, and nylon 11 as an outer layer.

In practice, trenches are laid out and the various lengths of piping are laid in the trenches and connected to the various underground access chambers 20 and drip pans 26 via the sealing members 34. Once connected, a portion of the outer pipe 42 is cut and removed so that a sufficient amount of the inner pipe 40 extends past the termination end 39 of the outer pipe 42 to permit the inner pipe 40 to be attached to a suitable coupling 44.

Before a coupling 44 is attached to the inner pipe 40, an appropriate seal may be placed over the outside of the inner pipe 40 to sealingly engage the outer pipe 42 whereby pressurized air may be communicated to the annular space (FIG. 5) formed between the inner and outer pipes 40 and 42 to test the same to be sure that there are no leakage points in the containment system. Obviously, the opposite ends of the pipe 42 of each of the access chambers 22 and drip pans 26 must be sealed in order to effectively perform such a test. Likewise, the inner pipes 40 can be subjected to air pressure to test their integrity. Once the installer is satisfied that the containment piping system is able to perform its function without concern for leakage, the trenches within which the containment pipes 14 have been laid are backfilled.

Figure 6:
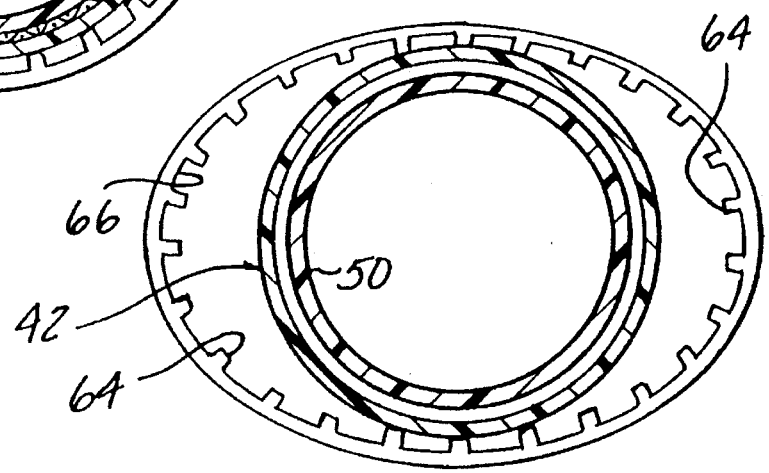
FIG. 6 is a view similar to FIG. 5 illustrating, in a slightly exaggerated manner, the secondary containment piping system after backfilling.

The weight of the earth on the flexible outer pipe 42 deforms the pipe 42 in the manner similar to that illustrated in FIG. 6 of the drawings, until the outer ends of the projections 64 abut the outer wall of the inner pipe 40. The abutment of the projections 64 with the wall 40 provides a two-fold purpose. First, it snugly and lockingly engages the pipe 40 and prevents relative movement between the inner and outer pipes providing for a more secure system. Secondly, the space between U-shaped cross sectional areas and the space between the inner and outer walls always insures a flow path for any fuel that may leak into the annular space between the inner and outer pipes. The view illustrated in FIG. 6 is illustrative of the condition that may exist. However, it should be noted that the outer tube 42 may be deformed in a variety of different shapes. Suffice it to say that a continuous flow path will exist in the event there is a leakage from the primary inner pipe 40. While it is preferred that the primary pipe 40 and secondary containment pipe 42 be assembled at a factory location, there may be situations in which the pipes are assembled on site before burial. The pipe 40 may be removed and either pipe may be replaced if a leak is found during testing. Once buried, the weight of the fill collapses appropriate portions of the outer containment pipe 42 around the primary pipe 40 and the primary pipe 40 may no longer be removed after burial.

An alternate preferred embodiment comprises the use of one or multiple wrapped barrier films included in the structure of inner supply pipe 40 and/or outer secondary containment pipe 42. The addition of such barrier films allows for a greater degree of alcohol or hydrocarbon permeation resistance, thereby further enhancing the protection of the environment within which the secondary containment piping system is placed.

Figure 8:
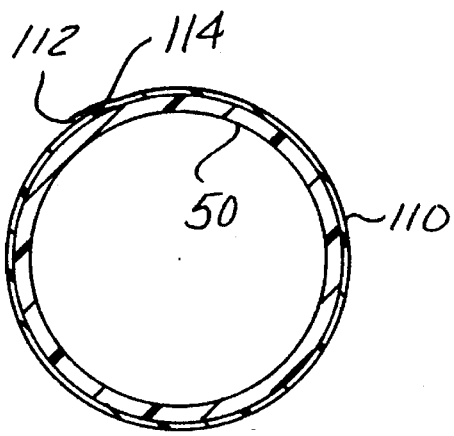
FIG. 8 is a cross sectional view of the first layer of the inner supply pipe showing, in an exaggerated manner, a single polyester film wrap thereover.

Referring now to FIG. 8, there is shown a preferred embodiment of use of a barrier film. The first, inner layer 50 of inner pipe 40 is fabricated from any suitable material, however, in the preferred embodiment, this is a plasticized nylon 12 material. It may be of any suitable diameter and the cross-sectioned wall may be of any suitable width. In the preferred embodiment, the width of first, inner layer is approximately 0.080 inches. A second layer 110 comprises a wrap having two opposed longitudinal edges 112, 114 in overlying relationship. The second layer 110, as with all the barrier films described herein, may be made from any suitable material having barrier properties. However, in the preferred embodiment, this second layer is fabricated from a polyester film having a very high tensile strength. One such polyester film is commercially available from E. I. du Pont de Nemours Company under the trade name MYLAR.

It is to be understood that the embodiment shown in FIG. 8, as well as each of the embodiments shown in FIGS. 7–13, may be used interchangeably with each other, and with the embodiments described more fully above. For example, the embodiment shown in FIG. 8 may further comprise a third layer comprising a nylon reinforced braid 52, such as a nylon 6 yarn. It may further comprise a fourth, outer layer 54 comprising a polyethylene material, such as a low density polyethylene. Examples of suitable widths of the layers just mentioned may be 0.0015 inches for the polyester film layer 110, 0.015 inches for the nylon reinforced braid layer, and 0.060 inches for the polyethylene layer. The nominal inner diameter for inner pipe 40 in the embodiment just described may be about 1.680 inches, with a nominal outer diameter of approximately 1.990 inches.

Figure 12:
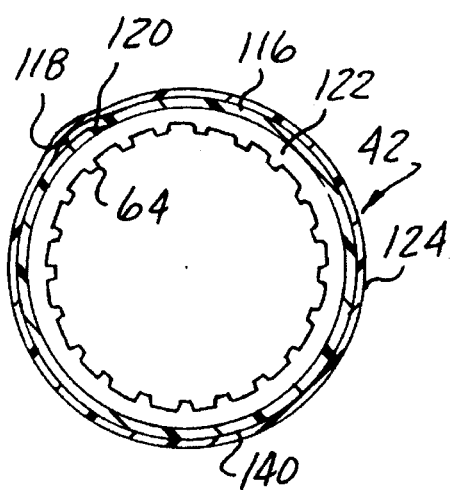
FIG. 12 is the outer pipe showing, in an exaggerated manner, a single polyester film wrap thereover and a polyethylene covering layer.

Referring now to FIG. 12, there is shown a preferred embodiment of the outer secondary containment pipe 42. This pipe 42 has an outer layer 116 having two opposed longitudinal edges 118, 120 in overlying relationship, the wrap being fabricated from a polyester film as described above. More specifically, outer pipe 42 comprises a first, inner layer 122 comprised of one of a polyethylene or an ethylene vinyl acetate material. It is to be further understood that this layer 122 may be made of any suitable material including, but not limited to any of the exemplary outer pipe 42 materials listed more fully above. First layer 122 has a plurality of radially inwardly projecting flanges 64.

Wrap layer 116 preferably may comprise a metallized film, and a third, outer layer 124 comprises any suitable polyethylene material.

As stated above, in a similar fashion, the diameters and cross-sectional widths of outer pipe 42 may be determined as desired. In a preferred embodiment, the wrap layer 116 is approximately 0.002 inches, and the outer pipe 42 nominal inner diameter may be 2.050 inches, and the nominal outer diameter may be 2.38 inches.

In addition to opposed edges 118, 120 being in overlying relationship as shown in FIG. 12, these edges may also be butt sealed. Further, overlying edges 118, 120 may have a polyethylene based heat seal adhesive 126, as shown with the embodiments in FIGS. 10, 11 and 13. It is to be understood that these figures are slightly exaggerated for illustrative purposes, in that the edges in overlying relationship would be nearly undetectable, and, when the heat seal adhesive 126 is used, due to its polyethylene base, this will form a substantially undetectable seamless wrap.

Figure 7:
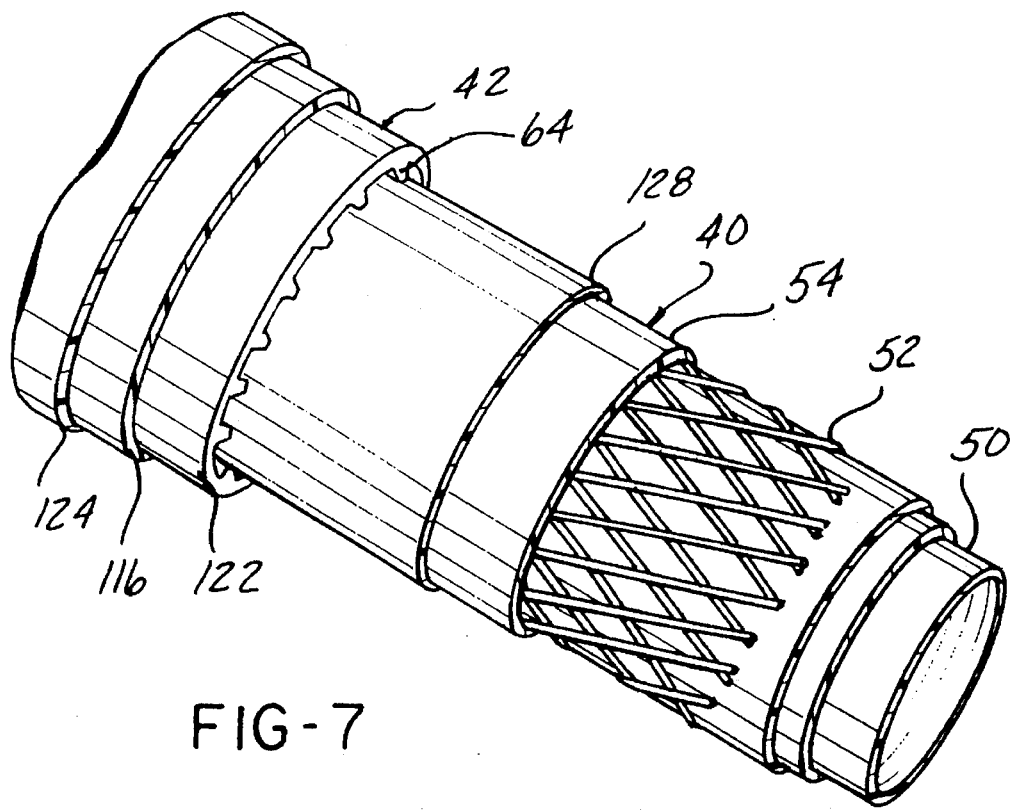
FIG. 7 is an enlarged perspective view of the inner and outer pipes utilized in the secondary containment piping system of the present invention with layers of the inner and outer pipes removed for illustrative purposes.

Another alternate embodiment of the outer pipe 42 is shown in FIG. 7. In this embodiment, the outer secondary containment pipe 42 comprises a wrap layer 128 having two opposed longitudinal edges in overlying relationship, the wrap being fabricated from a polyester film. This layer 128 may be used as a separating layer between outer pipe 42 and inner supply pipe 40. A second layer 122 is comprised of one of a polyethylene and an ethylene vinyl acetate material, the second layer 122 having a plurality of radially inwardly projecting flanges 64. A third layer 116 comprises a wrap having two opposed longitudinal edges, the wrap being fabricated from a metallized polyester film. A fourth layer 124 comprises a polyethylene material.

Figure 13:
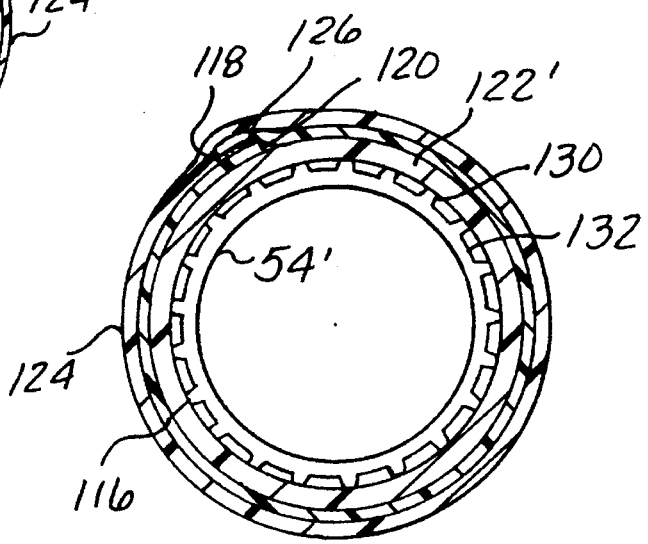
FIG. 13 shows the outer surface of the inner supply pipe having outward projections, the outer pipe having a smooth inner surface, and showing, in an exaggerated manner, a single polyester film wrap thereover with a heat seal adhesive between the overlapping wrap edges and a polyethylene covering layer.

Referring now to FIG. 13, there is shown an alternate embodiment of the outer layer 54 of inner pipe 40. Outer layer 54' of inner pipe 40 has a plurality of radially outwardly projecting flanges 130 extending from the outer surface 132 of outer layer 54'. Modified first layer 122' has a smooth inner surface and is comprised of one of a polyethylene and an ethylene vinyl acetate material. A second layer comprises a wrap 116 having two opposed longitudinal edges 118, 120 in overlying relationship, the wrap 116 being fabricated from a polyester film. A polyethylene based heat seal adhesive 126 extends between the overlying wrap edges 118, 120 and forms a seamless wrap. A third, outer layer 124 comprises a polyethylene material.

For any of the embodiments shown and those not specifically shown, any of the wrap layers may be "cigarette" wrapped or spiral wrapped, or wrapped by any other suitable method. Further, although one wrap, either simply in overlying relationship, butt sealed or adhesively sealed is sufficient to provide desirable barrier properties, two or more wraps may be successively applied to the inner pipe 40 and/or outer pipe 42. When this is done, it is preferable to rotate the successive seams 180° from the seam of the immediately preceding wrap.

Further, each wrap does not have to be formed from exactly the same polyester film. For example, a first wrap layer may be a formed from a polyester film; a second wrap layer may be formed from a copper foil, with the foil seam rotated 180° from the first polyester film seam; and a third wrap layer may comprise a polyester film, with the polyester film seam rotated 180° from the copper foil seam.

The addition of successive wraps is a safeguard in the event that the alcohol, hydrocarbon, or other environmentally unsafe fluid escapes through the seam of the first wrap. If this did occur, such fluid would have to travel a full 180° in order to escape from the seam of a second wrap; if such occurred, the fluid would have to turn around and travel a full 180° to escape from a third wrap, and so on. It can be seen that, since there is little likelihood that such fluid would escape from the first seam, the chance of the fluid traveling in such a manner through a second, third, fourth, etc. wrap to eventually escape is substantially non-existent. As such, a point of diminishing returns may be reached, and the manufacturer and/or user, may see no necessity in providing more than perhaps one or two barrier film wraps.

Figure 9:
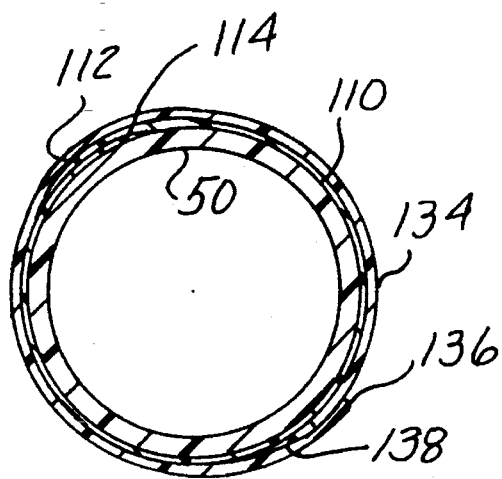
FIG. 9 is a cross sectional view of the first layer of the inner supply pipe showing, in an exaggerated manner, a double polyester film wrap thereover, with the wrap seams rotated 180° from each other.
Figure 10:
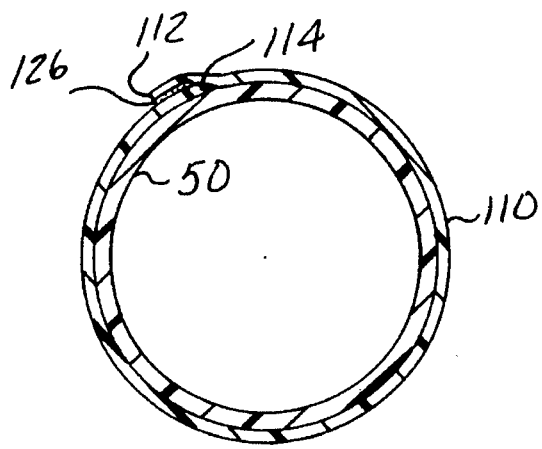
FIG. 10 is a cross sectional view of the first layer of the inner supply pipe having a single polyester film wrap thereover and showing, in an exaggerated manner, the wrap edges overlapping with a heat seal adhesive therebetween.
Figure 11:
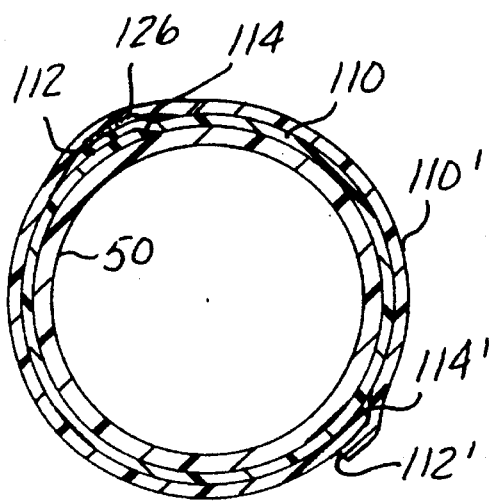
FIG. 11 is a view similar to FIG. 10, with an additional polyester film wrap over the first wrap.

Two such wraps are shown in FIG. 9, and are designated as 110, 134. Wrap 110 has opposed overlying edges 112, 114; and wrap 134 has opposed overlying edges 136, 138. As can be seen in FIG. 9, the seam formed by edges 136, 138 is rotated 180° from the seam formed by edges 112, 114.

With any of the single or multiple wrap layers shown, the polyester film may be a metallized polyester film, as stated above. Further, this metallized polyester film more specifically may be aluminized. Further, the wrap layer may be comprised of a polyvinyl fluoride coated polyester film, or a polytetrafluoroethylene plastic-impregnated polyester film. One such polytetrafluoroethylene plastic material is commercially available from E. I. du Pont de Nemours Company under the trade name TEFLON.

Further, the polyethylene based heat seal adhesive 126 may be used in any of the embodiments shown or described. The heat seal adhesive is shown used in FIG. 10 with a single wrap over inner layer 50. The embodiment shown in FIG. 10 may preferably be suitable for suction piping and/or vent piping. Further, as in FIG. 11, the heat seal adhesive 126 may be used in conjunction with a second wrap non-adhesively sealed. The second wrap is designated as 110', with opposed longitudinal edges 112', 114'. The embodiment shown in FIG. 11 may preferably be suitable for pressure piping. It is to be understood that the adhesive may be coated in any suitable quantity on the inner or outer surface of wrap layers. Further, in the embodiment shown in FIG. 12, the wrap layer 116 is adhesively coated along its entire outer surface to outer layer 124 by adhesive 140.

Some of the many advantages of using a wrapped barrier film layer are as follows. The addition of extra extruders and the time, expense and general problems involved in coextruding is substantially eliminated. Further, since the wrap is applied at a simple and conventional wrapping machine, it allows a manufacturer to use materials like the polyvinyl fluoride coated MYLAR, which material would be very difficult to set up in a coextrusion process.

In an alternate embodiment not shown, the secondary containment system may comprise an inner supply pipe comprising a first layer of crosslinked polyethylene; a second layer comprised of a wire helix material; a third layer comprised of a polyester fiber reinforcing material; and a fourth layer comprised of an oil and gasoline resistant nitrile cover. The outer pipe 42 may be as generally described hereinabove.

It is to be further understood that the barrier films of the alternate preferred embodiment may be used in secondary containment systems having removable/replaceable inner supply pipes, such as any of those systems mentioned hereinabove having rigid outer secondary containment pipes or a combination of rigid straight pipe with the larger diameter, convoluted plastic pipe. Any of the embodiments of inner supply pipe 40 having one or more barrier film wraps described above, including those embodiments shown in FIGS. 7–13, may be used in conjunction with such a removable or replaceable secondary containment system.

Still further, it is to be understood that the barrier films of the alternate preferred embodiment may be used in primary piping systems. Primary piping systems contemplated include, but are not limited to automotive fuel lines, chemical plant hose, and tank truck hose for unloading, for example, gasoline. Depending upon the application, these primary piping systems may be buried in the ground, run through buildings, motor vehicles, etc. The barrier films mentioned above may prove particularly useful when such primary piping systems are transporting hazardous fluids. Any of the embodiments of inner supply pipe 40 having one or more barrier film wraps described above, including those embodiments shown in FIGS. 7–13, may be adapted for use in conjunction with such primary piping systems. Further, it is contemplated that the outer secondary containment pipe 42 as described above, including any embodiments shown in FIGS. 7–13, may also prove useful in some circumstances in the chemical, automotive, etc. applications listed above.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A secondary containment piping system, comprising an inner supply pipe, and a flexible, hazardous fluid-impervious outer secondary containment pipe, within which the inner supply pipe is carried, one of an outer surface of the inner supply pipe and an inner surface of the outer pipe having a plurality of radially outwardly projecting flanges adapted to engage the other of the outer surface of the inner supply pipe and the inner surface of the outer pipe when the pipes are buried to provide a locking engagement of the pipes with respect to each other, and to provide for a flow passage between the pipes, the improvement comprising:

a first, inner layer of the inner pipe being fabricated from nylon;

a second layer comprising a wrap having two opposed longitudinal edges in overlying relationship, the wrap being fabricated from a polyester film;

a third layer comprising a nylon reinforced braid; and a fourth, outer layer comprising a polyethylene material.

2. The secondary containment piping system as defined in claim 1 wherein the outer secondary containment pipe has an outer layer comprising a wrap having two opposed longitudinal edges in overlying relationship, the wrap being fabricated from a polyester film.

3. The secondary containment piping system as defined in claim 1 wherein the outer secondary containment pipe comprises:

a first, inner layer comprised of one of a polyethylene and an ethylene vinyl acetate material, the first layer having a plurality of radially inwardly projecting flanges;

a second layer comprising a wrap having two opposed longitudinal edges, the wrap being fabricated from a metallized polyester film; and a third, outer layer comprising a polyethylene material.

4. The secondary containment piping system as defined in claim 3 wherein the opposed edges are in overlying relationship.

5. The secondary containment piping system as defined in claim 3 wherein the opposed edges are butt sealed.

6. The secondary containment piping system as defined in claim 3 wherein the opposed edges are in overlying relationship, the piping system further comprising a polyethylene based heat seal adhesive extending between the overlying wrap edges and forming a seamless wrap.

7. The secondary containment piping system as defined in claim 1 wherein the outer secondary containment pipe comprises:

a first, inner layer comprising a wrap having two opposed longitudinal edges in overlying relationship, the wrap being fabricated from a polyester film;

a second layer comprised of one of a polyethylene and an ethylene vinyl acetate material, the second layer having a plurality of radially inwardly projecting flanges;

a third layer comprising a wrap having two opposed longitudinal edges in overlying relationship, the wrap being fabricated from a metallized polyester film; and a fourth, outer layer comprising a polyethylene material.

8. The secondary containment piping system as defined in claim 1 wherein the inner pipe outer surface has a plurality of radially outwardly projecting flanges, and wherein the outer pipe is comprised of:

a first layer comprised of one of a polyethylene and an ethylene vinyl acetate material;

a second layer comprising a wrap having two opposed longitudinal edges in overlying relationship, the wrap being fabricated from a polyester film;

a polyethylene based heat seal adhesive extending between the overlying wrap edges and forming a seamless wrap; and a third, outer layer comprising a polyethylene material.

9. The secondary containment piping system as defined in claim 1 wherein the second layer overlying edges form a first seam, and wherein the inner pipe further comprises:

a first intermediate layer, disposed between the second layer and a second intermediate layer, comprising a wrap having two opposed longitudinal edges in overlying relationship, the overlying edges forming a second seam, the second seam being rotated 180° from the first seam, the wrap being fabricated from a copper foil; and the second intermediate layer disposed between the first intermediate layer and the third layer, comprising a wrap having two opposed longitudinal edges in overlying relationship, the overlying edges forming a third seam, the third seam being rotated 180° from the second seam, the wrap being fabricated from a polyester film.

10. The secondary containment piping system as defined in claim 1 wherein the second, wrap layer is fabricated from a polyvinyl fluoride coated polyester film.

11. The secondary containment piping system as defined in claim 1 wherein the second layer is fabricated from a polytetrafluoroethylene plastic-impregnated polyester film.

12. The secondary containment piping system as defined in claim 1 wherein the second layer is fabricated from a metallized polyester film.

13. The secondary containment piping system as defined in claim 12 wherein the metallized polyester film is aluminized.

14. The secondary containment piping system as defined in claim 12, further comprising a polyethylene based heat seal adhesive extending between the overlying wrap edges and forming a seamless wrap.

15. The secondary containment piping system as defined in claim 1 wherein the second layer overlying edges form a first seam, the second layer wrap being fabricated from a metallized polyester film, and wherein the inner pipe further comprises:

- a polyethylene based heat seal adhesive extending between the second layer overlying wrap edges and forming a seamless wrap; and
- an intermediate layer, disposed between the second layer and the third layer, comprising a wrap having two opposed longitudinal edges in overlying relationship, the overlying edges forming a second seam, the second seam being rotated 180° from the first seam, the wrap being fabricated from a polyvinyl fluoride coated polyester film.

16. A secondary containment piping system, comprising an inner supply pipe, and a flexible, fuel impervious outer secondary containment pipe, within which the inner supply pipe is carried, one of an outer surface of the inner supply pipe and an inner surface of the outer pipe having a plurality of radially outwardly projecting flanges adapted to engage the other of the outer surface of the inner supply pipe and the inner surface of the outer pipe when the pipes are buried to provide a locking engagement of the pipes with respect to each other, and to provide for a flow passage between the pipes, the improvement comprising:

the inner supply pipe, comprising:

a first, inner layer fabricated from nylon;

a second layer comprising a wrap having two opposed longitudinal edges in overlying relationship, the overlying edges forming a first seam, the wrap being fabricated from a metallized polyester film;

a polyethylene based heat seal adhesive extending between the overlying wrap edges and forming a seamless wrap;

a third layer comprising a wrap having two opposed longitudinal edges in overlying relationship, the overlying edges forming a second seam, the second seam being rotated 180° from the first seam, the wrap being fabricated from a polyvinyl fluoride coated polyester film;

a fourth layer comprising a nylon reinforced braid; and a fifth, outer layer comprising a polyethylene material; and the outer secondary containment pipe, comprising:

a first, inner layer comprising a wrap having two opposed longitudinal edges in overlying relationship, the wrap being fabricated from a polyester film;

a second layer comprised of one of a polyethylene and an ethylene vinyl acetate material, the second layer having a plurality of radially inwardly projecting flanges;

a third layer comprising a wrap having two opposed longitudinal edges, the wrap being fabricated from a metallized polyester film; and a fourth, outer layer comprising a polyethylene material.

17. The secondary containment piping system as defined in claim 16 wherein the third layer is adhesively bonded to the fourth layer.

18. A secondary containment piping system, comprising an inner supply pipe, and a flexible, fuel impervious outer secondary containment pipe, within which the inner supply pipe is carried, one of an outer surface of the inner supply pipe and an inner surface of the outer pipe having a plurality of radially outwardly projecting flanges adapted to engage the other of the outer surface of the inner supply pipe and the inner surface of the outer pipe when the pipes are buried to provide a locking engagement of the pipes with respect to each other, and to provide for a flow passage between the pipes, the secondary containment piping system further comprising spaced, underground chambers which are interconnected in a fluid tight manner through walls thereof by the secondary containment pipe which passes therethrough, the inner supply pipe having end couplings attached to the ends thereof, the end couplings being disposed within the chambers at a point beyond the termination of the outer secondary containment pipe, the inner and outer pipes being impervious to the fluids to be transmitted therethrough, the improvement comprising:

the inner supply pipe, comprising:

a first, inner layer fabricated from nylon;

a second layer comprising a wrap having two opposed longitudinal edges in overlying relationship, the wrap being fabricated from a polyester film;

a third layer comprising a nylon reinforced braid; and a fourth, outer layer comprising a polyethylene material; and the outer secondary containment pipe, comprising:

a first layer comprised of one of a polyethylene and an ethylene vinyl acetate material, the first layer having a plurality of radially inwardly projecting flanges;

a second layer comprising a wrap having two opposed longitudinal edges, the wrap being fabricated from a metallized polyester film; and a third, outer layer comprising a polyethylene material.

19. The secondary containment piping system as defined in claim 18, wherein the second layer overlying edges form a first seam, the second layer wrap being fabricated from a metallized polyester film, and wherein the inner supply pipe further comprises:

- a polyethylene based heat seal adhesive extending between the second layer overlying wrap edges and forming a seamless wrap; and
- an intermediate layer, disposed between the second layer and the third layer, comprising a wrap having two opposed longitudinal edges in overlying relationship, the overlying edges forming a second seam, the second seam being rotated 18° from the first seam, the wrap being fabricated from a polyvinyl fluoride coated polyester film;

and wherein the outer secondary containment pipe further comprises a separating layer extending around the outer pipe first layer, the separating layer comprising a wrap having two opposed longitudinal edges in overlying relationship, the wrap being fabricated from a polyester film.

20. A secondary containment piping system, comprising an inner supply pipe, and a hazardous fluid-impervious outer secondary containment pipe, within which the inner supply pipe is carried, a flow passage being defined between the pipes, the improvement comprising:

a first, inner layer of the inner pipe being fabricated from nylon;

a second layer comprising a wrap having two opposed longitudinal edges in overlying relationship, the wrap being fabricated from a polyester film;

a third layer comprising a nylon reinforced braid; and a fourth, outer layer comprising a polyethylene material.

21. The secondary containment piping system as defined in claim 20 wherein the second layer overlying edges form a first seam, the second layer wrap being fabricated from a metallized polyester film, and wherein the inner pipe further comprises:

a polyethylene based heat seal adhesive extending between the second layer overlying wrap edges and forming a seamless wrap; and an intermediate layer, disposed between the second layer and the third layer, comprising a wrap having two opposed longitudinal edges in overlying relationship, the overlying edges forming a second seam, the second seam being rotated 180° from the first seam, the wrap being fabricated from a polyvinyl fluoride coated polyester film.

* * * * *